Sept. 27, 1966   E. M. WELLMAN   3,275,029
DASH CONTROL UNIT
Filed Jan. 8, 1964

INVENTOR.
ELLIS M. WELLMAN
BY
RICHEY, McNENNY & FARRINGTON
Donald W. Farrington
ATTORNEYS 3,275,029
DASH CONTROL UNIT
Ellis M. Wellman, Erie, Pa., assignor to The Weatherhead Company, Cleveland, Ohio, a corporation of Ohio
Filed Jan. 8, 1964, Ser. No. 336,412
5 Claims. (Cl. 137—560)

The present invention relates to automotive control apparatus and more particularly to a dash control used in the environment of a speed control apparatus on an automobile.

With the advent of the wide current use of turnpikes, super-highways, and the like, a number of automobile drivers are utilizing devices which will minimize the strain involved in maintaining a uniform speed near the maximum turnpike or superhighway speed. Generally speaking, such devices include means to adjust the throttle for a given speed such as seventy miles an hour and governor mechanism to compensate for changes in grade or load imposed on the vehicle.

It is among the objects of my invention to provide a dash control by which the vehicle operator may, by means of a Bowden wire, or the like, set the throttle opening affected by the governor and which, at the same time, will respond to brake actuation to disestablish throttle control, and which will also serve as a valve for manifold vacuum acting through the governor to maintain the throttle setting.

It is a further object of my invention to provide a dash control for a system which includes a governor responsive to vehicle speed and which governor throttles manifold vacuum to a vacuum actuator operatively connected to the throttle.

It is a further object of my invention to provide a dash control according to the preceding objects wherein a manually operable knob may be rotated to drive a rack and pinion, and wherein the rod is at the same time movable axially to open or close a conduit for manifold vacuum leading to the governor without changing the rack and pinion position during axial movement of the rod.

It is a further object of my invention to provide a control device according to the preceding objects wherein manual manipulation of the knob by the operator overrides other forces acting on the control device.

Further objects and advantages relating to efficiency and safety in operation, low cost manufacture and convenience in use will appear from the following description and the appended drawings wherein.

Figure 4:
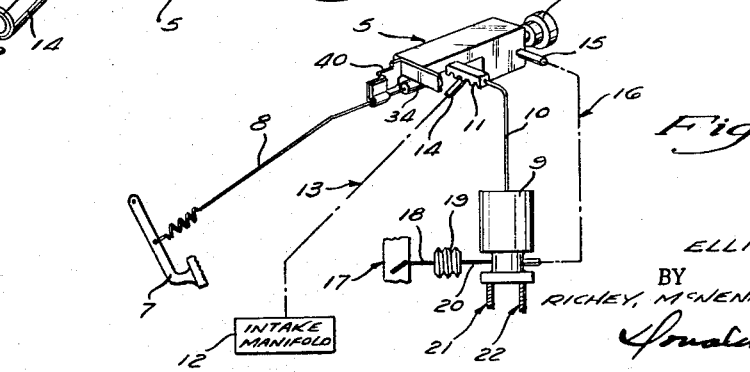
FIG. 4 is a showing of the dash control in perspective and a diagram of the related automotive throttle control components.

With reference to the use of my invention, the dash control shown in its entirety as at 5 in FIG. 4 includes a manually operable knob 6 which is arranged within the driver's compartment in a position convenient to the vehicle operator. The conventional brake pedal 7 is operatively connected by a Bowden wire assembly 8 to the dash control 5. Similarly, a speed governor assembly 9 is connected by a Bowden wire assembly 10 to a reciprocating rack 11 mounted for transverse movement to the dash control 5.

The automobile engine intake manifold is indicated at 12 and a vacuum line 13 leads from the intake manifold to the inlet pipe 14 carried by the dash control. A vacuum outlet pipe 15 on the dash control leads by way of line 16 to the governor 9.

The engine throttle and intake assembly is indicated at 17 and the rocking lever which determines the throttle opening is connected by means of link 18 to a vacuum actuator 19 connected by vacuum line 20 to the governor 9.

Preferably the governor 9 is of the type described in the co-pending application of John L. Fuller, Serial No. 142,265, filed Oct. 2, 1961, now abandoned. In such type of governor a flexible drive, indicated at 21, leads into the governor body 9 from the speedometer cable. A similar flexible drive 22 leads from the transmission into the governor body 9. The arrangement is such that rotation from the speedometer or the transmission will rotate a valve assembly within the governor 9. The valve assembly in the governor 9 is such that vacuum entering by way of line 16 is throttled and exits by way of line 20 leading to the vacuum actuator 19. The speed setting of the governor is accomplished by movement of the Bowden wire 10 leading to the governor 9.

It will be understood that the arrangement is one wherein the control of the vacuum actuator 19 is a function of the rotation introduced by means 21–22 and a function of manifold vacuum changes introduced by way of line 16. For example, if the vehicle control apparatus is set to maintain seventy miles an hour, and additional load is imposed on the vehicle by going up a grade, reduction in manifold pressure is compensated for so that the throttle is moved to introduce more fuel to the engine. As will be understood in connection with the dash control operation, application of the brake 7 will close the vacuum line and require manual actuation of the foot throttle. Also, as will be understood from the description of the dash control, the change in speed setting as from seventy miles an hour to fifty miles an hour may be accomplished with the dash control without altering the manifold vacuum lines.

The dash control 5 includes a body 5a having an axial bore 30 therein which serves as a bearing sleeve or guide for a reciprocable rod 31. The outer end of the rod, which is arranged to project through the instrument panel and toward the vehicle operator, carries the knob 6 secured by set screw 32. The inner end of the rod, as at 33, is journaled within a block 34 by means of snap ring 35 so that the rod 31 may rotate within the block 34 and yet transmit reciprocating motion from the rod 31 to the Bowden wire 8. The Bowden wire is anchored within the block 34 by set screw 36.

A reduced end portion of the control rod 31 is threaded as at 37 and the pinion 38 is threaded onto the rod 31 so that rotation of the rod 31 will be imparted to the pinion 38 and thence to the rack 11. The rack 11 is mounted in spaced notches 39 in the body 5a so that rotation of the rod 31 results in reciprocation of the rack 11.

A bracket 40 is secured to the end of the valve body 5a by means of screws 41–42 so as to support clamp assembly 43 and clamp assembly 44 for the housings of Bowden wires 8 and 10, respectively. The Bowden wire 10 is anchored as at 45 in the end of the reciprocable rack 11.

The end of the body 5a adjacent the manual control knob 6 is provided with a valve cavity 47–48. The rod 31 carries a valve closure member 49 which is adapted to be moved by the rod so as to close the valve cavity portion 48 with respect to the valve cavity 47. The rod 31 is provided with O-ring seals 31c and 31d to seal the vacuum cavities 47 and 48. The inlet line 14 from the engine manifold opens into the valve cavity 48 and the outlet pipe 15 exits from the valve cavity 47. This arrangement provides that axial movement of the rod will move the valve member 49 and thus control the admission of manifold vacuum to the governor 9.

Figure 1:
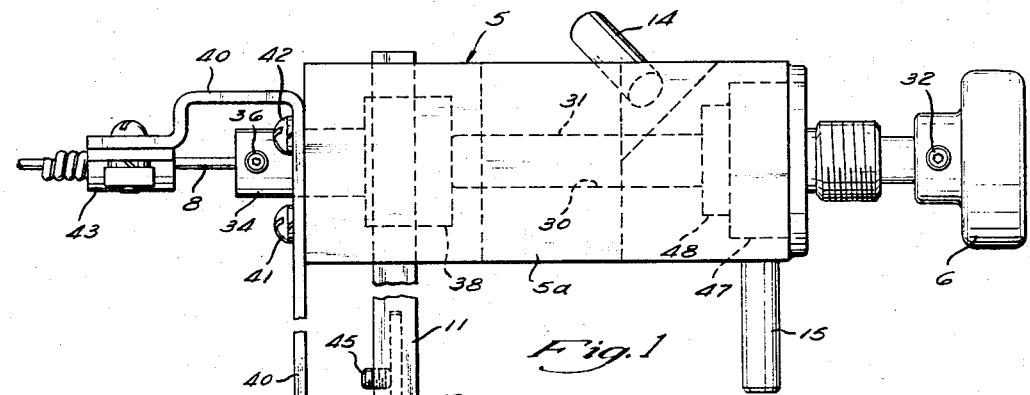
FIG. 1 is a plan view of the dash control made according to my invention.
Figure 2:
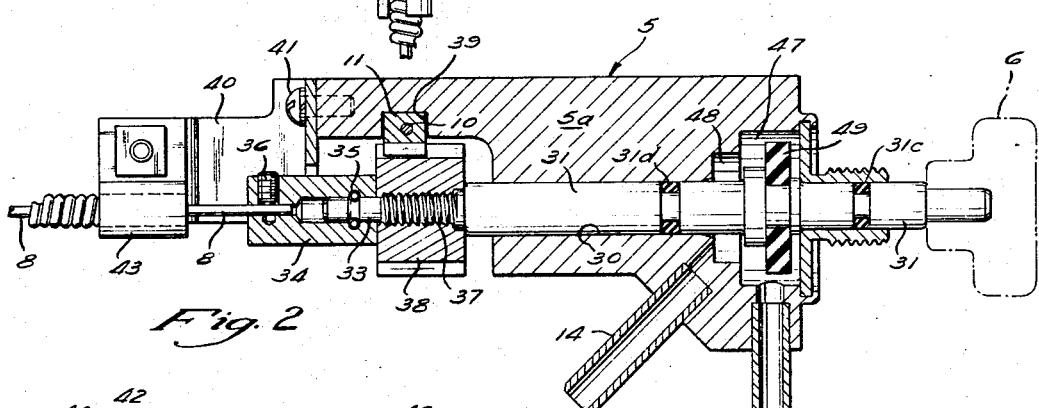
FIG. 2 is a sectional view of the dash control taken along plane 2—2 of FIG. 3.
Figure 3:
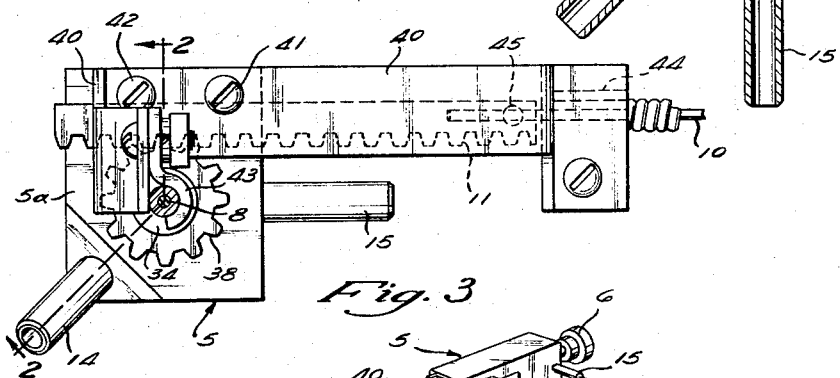
FIG. 3 is an end elevation of the dash control.

The pinion 38 is proportioned axially with respect to the rack 11 so that the pinion is maintained in engagement with the rack without regard to the axial position of the rod 31. Accordingly, the rod 31 may be rotated within the body 5a so as to change or modify the speed setting of the governor without regard to the axial position of the closure member 49. The speed setting may be increased or decreased during operation of the automatic control or the speed setting may be made before the rod 31 is pulled outwardly so as to initiate the operation of the automatic control. It will be understood that the knob 6 and the instrument panel carry suitable indicia to show the miles per hour setting position of the knob 6. Signal light indicia may be mounted to indicate whether or not the rod 31 is in its "ON" position, as shown in FIG. 2, or in its "OFF" position with the closure member 49 in position to seal chamber 48 with respect to chamber 47.

It will be understood by those skilled in the art that numerous modifications of the dash control may be made without departing from the scope of the invention as defined in the following claims:

What is claimed is:

1. Automotive control apparatus comprising a body adapted to be mounted on the instrument panel of an automobile, said body having an axial bore therein to slidably and rotatably mount a control rod, said body having a pinion cavity opening through one side of the body, said control rod proportioned to extend at opposite ends of said bore, a control knob fixed to said rod at one end of the rod, a pinion fixed to the other end of said rod in said pinion cavity, a rack having teeth in mesh with said pinion, said body having re-entrant notches to receive and guide said rack for reciprocation transversely of the body in response to control rod rotation, means to attach a brake wire at that end of the control rod remote from the knob, said body having a vacuum inlet and a vacuum outlet, valve means carried by said rod to open and close said inlet with respect to said outlet in response to control rod reciprocation.

2. Automotive control apparatus comprising a body adapted to be mounted on the instrument panel of an automobile, said body having an axial bore therein to slidably and rotatably receive a control rod, said body having a pinion cavity opening through one side of the body, said control rod proportioned axially to project beyond the body at opposite ends of said bore, a control knob fixed to said rod at the end of the rod adjacent the vehicle operator, a pinion fixed to the other end of said rod in said pinion cavity, a rack having teeth in mesh with said pinion, said body having re-entrant notches within the pinion cavity to receive and guide said rack for reciprocation transversely of the body in response to control rod rotation, means to attach a brake wire at that end of the control rod remote from the knob, said body having a vacuum inlet and a vacuum outlet, valve means carried by said rod to open and close said vacuum inlet with respect to said vacuum outlet in response to control rod reciprocation.

3. Automotive control apparatus comprising an elongated body, said body having a mounting boss at one end thereof, said boss adapted to be secured to the instrument panel of an automobile to support said body, said body having an axial bore therein, a control rod slidably and rotatably mounted in said bore, said body having a pinion cavity opening through one side of the body, said control rod proportioned axially with respect to said bore so as to project beyond the bore at opposite ends of said bore, a manually operable control knob fixed to said rod at one projecting end of the rod, a pinion fixed to the other end of said rod in said pinion cavity, a rack having teeth in mesh with said pinion, said body having re-entrant transverse notches to receive and guide said rack for reciprocation transversely of the body in response to control rod rotation, said notches opening into said pinion cavity, means to attach a brake wire at that end of the control rod remote from the knob, said body having a vacuum inlet chamber and a vacuum outlet chamber around the rod at that end of the body adjacent the knob, valve means carried by said rod to open and close said inlet chamber with respect to said outlet chamber in response to control rod reciprocation.

4. Automotive control apparatus comprising a body adapted to be mounted on the instrument panel of an automobile, said body having an axial bore therein to slidably and rotatably mount a control rod, said body having a pinion cavity opening through one side of the body, said control rod proportioned axially with respect to the bore to terminate at one end within the pinion cavity and to terminate at its opposite end beyond the end of the body, a control knob fixed to said rod at said opposite end of the rod, a pinion fixed to the other end of said rod in said pinion cavity, a rack having teeth in mesh with said pinion mounted in said pinion cavity, said body having re-entrant open notches to receive and guide said rack for reciprocation transversely of the body in response to pinion rotation, said rack proportioned with respect to said pinion and pinion cavity so that the pinion holds said rack in said open notches, means to attach a brake wire at that end of the control rod remote from the knob, said body having an adjoining vacuum inlet chamber and a vacuum outlet chamber opening into each other, valve means carried by said rod and moved thereby axially to open and close said inlet and outlet chambers with respect to each other.

5. Automotive control apparatus comprising an elongated body adapted to be mounted on the instrument panel of an automobile, said body having an axial bore therethrough, a reciprocating control rod mounted for axial sliding movement in said bore, a manual operating knob secured to one end of said control rod projecting from said body, a re-entrant pinion cavity in said body at the other end thereof, said body having a transverse groove opening into said pinion cavity, a rack mounted for sliding movement in said transverse groove, said pinion adapted to be moved in the direction of its length in response to rotation of said control shaft, said pinion having an axial extent approximately twice the axial extent of the teeth on said rack so as to remain in mesh with the rack during limited reciprocating movement of the control rod, a Bowden wire control carried by said body adjacent the end of said control rod remote from the manual knob, means to secure said Bowden wire to said control rod whereby movement of the Bowden wire is effective to move the control rod axially within said body, said body having a pair of adjoining vacuum chambers therein at that end of the body adjacent the manual knob, one of said vacuum chambers being an inlet chamber and the other of said chambers being an outlet chamber, said inlet chamber being smaller than said outlet chamber, closure means carried by said control rod and moved thereby to close the inlet chamber with respect to the outlet chamber when the control rod is moved in one direction axially within the body.

References Cited by the Examiner

UNITED STATES PATENTS 2,936,647    5/1960    Denman et al. _____ 74—504
3,158,239    11/1964    Marette et al. _____ 192—3

M. CARY NELSON, *Primary Examiner.*

W. CLINE, *Assistant Examiner.*